United States Patent [19]

Roberts et al.

[11] Patent Number: 5,728,978
[45] Date of Patent: Mar. 17, 1998

[54] ACOUSTIC ISOLATOR FOR ACOUSTIC WELL LOGGING TOOL

[75] Inventors: Edwin K. Roberts; Enrique Elizondo, both of Fort Worth, Tex.

[73] Assignee: Computalog U.S.A., Inc., Fort Worth, Tex.

[21] Appl. No.: 691,572

[22] Filed: Aug. 2, 1996

[51] Int. Cl.$^6$ ..................................... G01V 1/40
[52] U.S. Cl. .................. 181/102; 367/25; 367/911
[58] Field of Search ..................... 181/102–106; 367/25, 35, 911; 175/83; 403/291, 292

[56] References Cited

U.S. PATENT DOCUMENTS

| | | |
|---|---|---|
| 2,667,332 | 1/1954 | McCune et al. . |
| 2,687,282 | 8/1954 | Sanders . |
| 2,694,549 | 11/1954 | James . |
| 2,712,436 | 7/1955 | McCune et al. . |
| 2,716,542 | 8/1955 | Goble . |
| 2,726,847 | 12/1955 | McCune et al. . |
| 3,191,141 | 6/1965 | Schuster . |
| 4,171,031 | 10/1979 | Marquis ................................. 181/102 |
| 4,365,321 | 12/1982 | Von Bose ................................. 367/25 |
| 4,778,359 | 10/1988 | Pridy et al. . |
| 5,343,001 | 8/1994 | Cowles et al. . |

*Primary Examiner*—Khanh Dang
*Attorney, Agent, or Firm*—Charles D. Gunter; Andrew J. Dillon

[57] ABSTRACT

An acoustic well logging tool is shown having a transmitter section and a receiver section spaced apart by a semi-rigid housing. The semi-rigid housing includes a number of rigid tubular members which are joined by interlocking lobes which permit relative movement between the tubular members but which prevent the separation thereof. Gaps between the interlocking lobes are filled with a connecting material which differs significantly in acoustic impedance from the material of the remainder of the housing, whereby acoustic energy passing from the transmitter section along the body of the tool is delayed and attenuated.

11 Claims, 3 Drawing Sheets

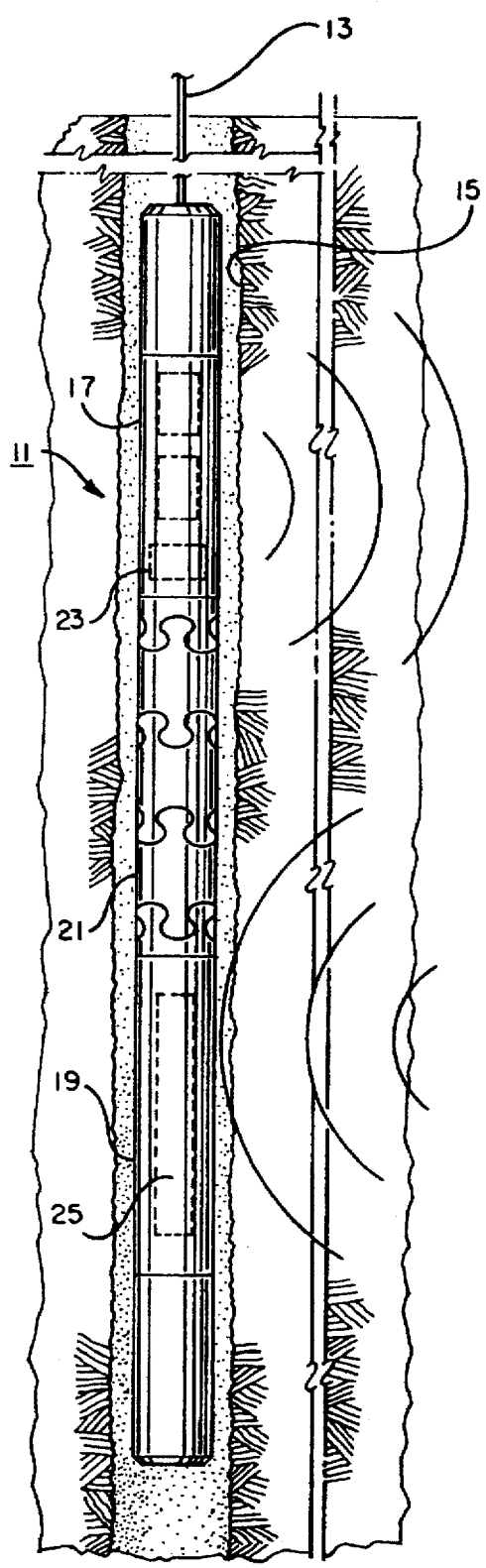
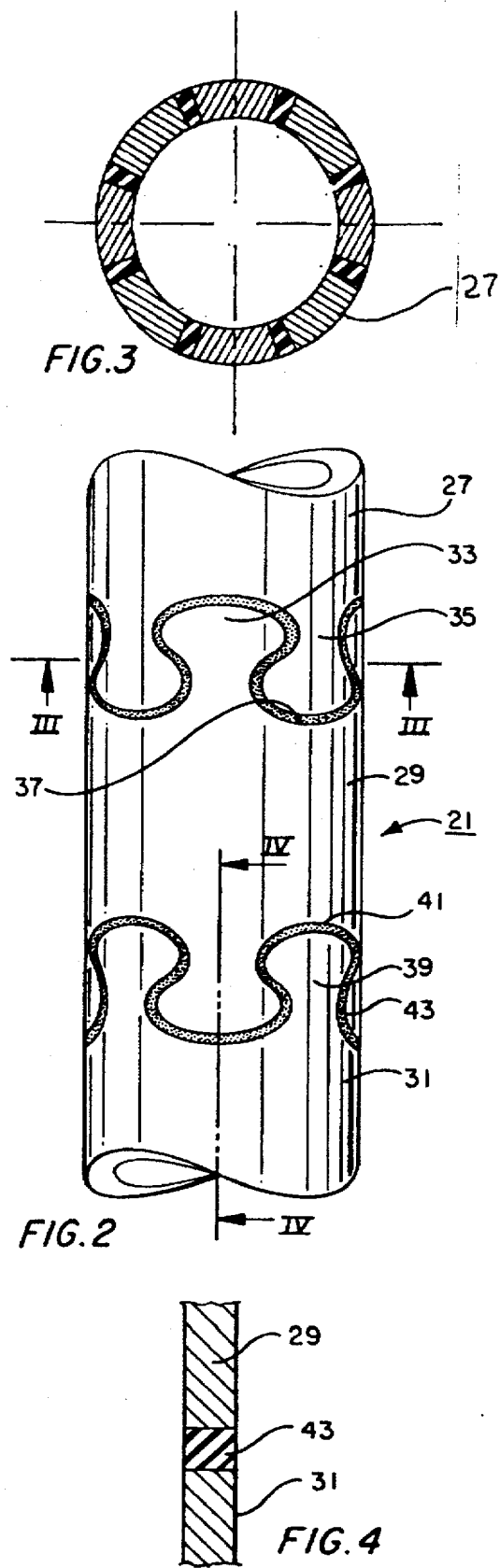
FIG. 1
FIG. 2
FIG. 3
FIG. 4

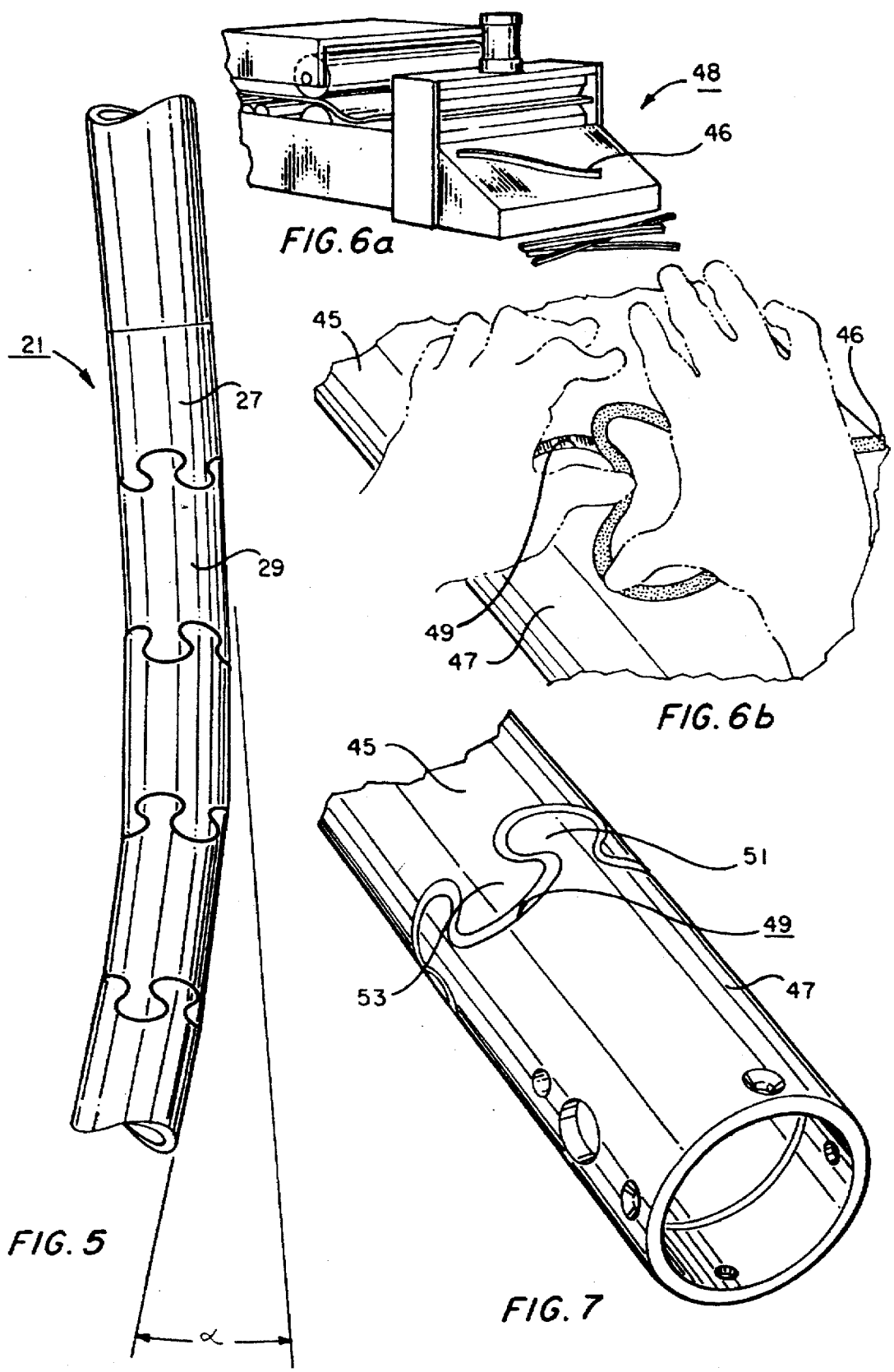

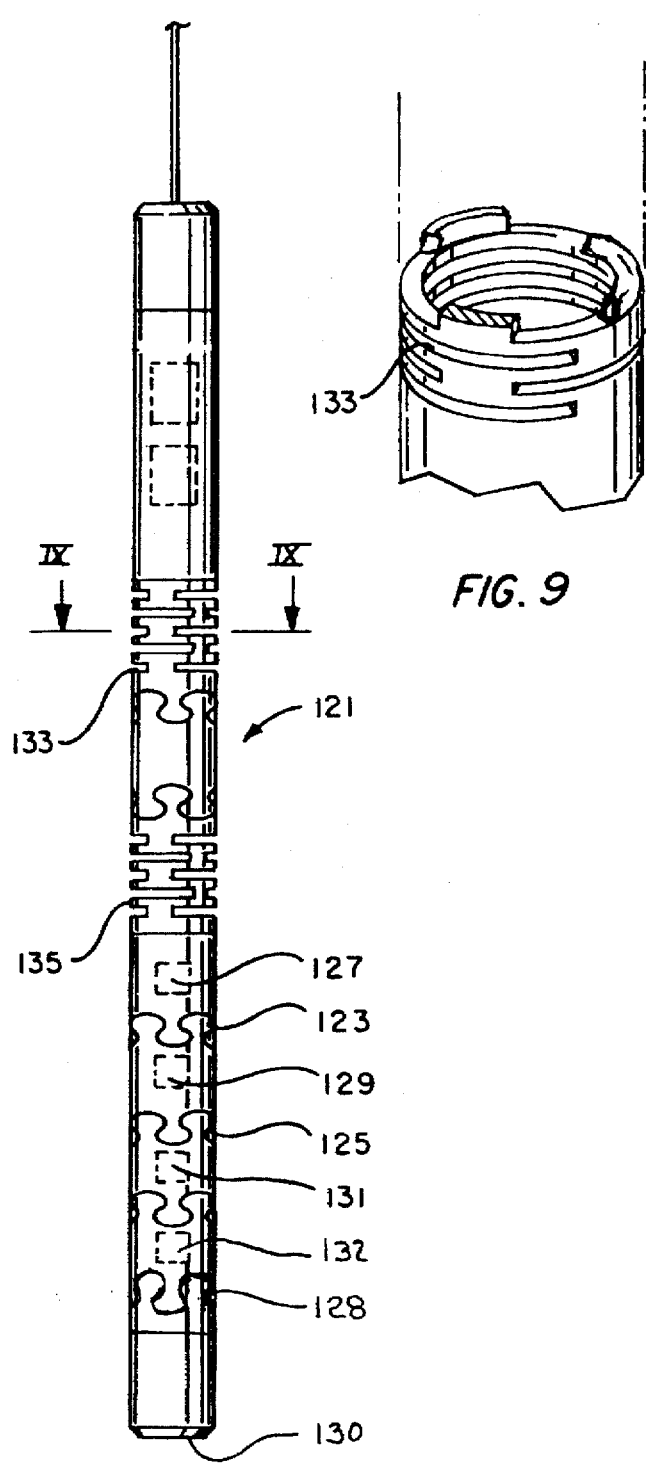
FIG. 8
FIG. 9
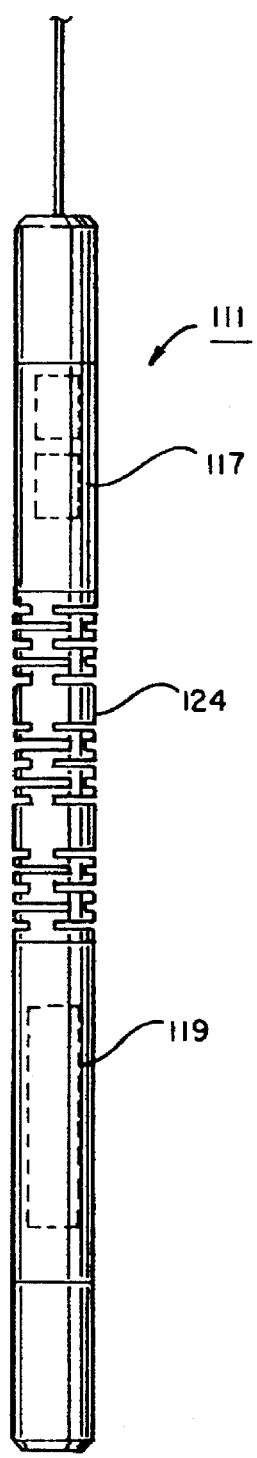
FIG. 10
PRIOR ART

ACOUSTIC ISOLATOR FOR ACOUSTIC WELL LOGGING TOOL

BACKGROUND OF THE INVENTION

1. Field of the Invention

The present invention relates generally to exploratory tools for use in oil and gas well bores and, more specifically, to an improved acoustic well logging tool which is designed to delay and attenuate acoustic waves which travel along the body of the tool while providing sufficient strength and stiffness for ease of handling by field personnel and to allow use in deviated well bores.

2. Description of the Prior Art

Many acoustic well logging tools are configured as cylindrically shaped, tubular bodies which are suitably sized for passage through a fluid filled well bore. The tool body is typically suspended on an armored communication cable and incorporates several acoustic transducers. At least one of the transducers functions as a transmitter to generate acoustic signals which are to be detected by one or more receiving transducers. In the following discussion, the terms "acoustic energy" and "acoustics" will be taken to refer to both compressional wave energy and shear wave energy. The desired detected signals are representative of the energy from the transmitter which travels through the borehole or the surrounding formation to the detector. Ideally, the detected signals would not contain any spurious signal information, sometimes referred to as "tool noise" or "road noise" in the industry.

Normally, the logging tool carries two or more transducers which are disposed and secured at a fixed distance from one another on the tool body. One typical arrangement would involve three transducers, one of which serves as a transmitter of sound waves, while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media transversed by the energy.

The acoustic signal which is generated by the transmitter in the borehole can be a symmetrical or an asymmetrical compressional wave form with respect to the borehole axis in the fluid. When the generated compressional wave travels through the liquid in the borehole and strikes the borehole wall, various types of elastic and guided waves, referred to herein as borehole waves, are produced as the earth/borehole response to the generated signals. The various borehole waves which are produced have different velocities and amplitude, i.e., frequency characteristics. Since these borehole waves are usually detected at a receiver transducer through a fluid coupling, borehole waves are also sometimes referred to as acoustic waves or signals. Because these acoustic waves types have different velocities and characteristics, various methods are used to enhance the ability of the logging tool to detect the wave forms so that the wave types may be distinguished during processing. By processing the wave forms using known techniques, particularly through the amplitude and phase relationships detected of the wave forms as a function of time and distance, the viscoelastic properties of the earth formations surrounding the borehole can be detected, such as, specifically, the compressional and shear wave speeds of the earth formations.

One type of transducer used as the sending and receiving element is the piezoelectric element or crystal and has been used for many years in the industry. A piezoelectric element used as a receiver or detector will provide an electrical output response signal when subjected to mechanical stress variations across its poling axis. An acoustic field may provide the mechanical stress to the detector. The desired output response from the detector is an electrical signal which represents a component of the variations in the acoustic field (the acoustic signal) in the borehole.

Ideally, the data collected by the transducer receiver will only include an accurate representation of the earth or borehole response to the signals generated from the tool's transmitters. However, it often occurs that signals obtained from conventional acoustic logging tools are subjected to various noises such as the "tool noise" and "road noise" previously mentioned. Noise, in the context of the present discussion, will primarily mean energy traveling within or on the surface of the logging tool that is not representative of the earth/borehole response to the transmitted signals. Noise of this type may interfere with the ability of the detector transducer to provide an accurate representation of the earth/borehole response. This occurs when noise of sufficient amplitude is detected along with the borehole waves. Noise can be produced by any elastic waves traveling on the surface or within the body of the acoustic logging tool. Road noise is any noise generated by motion of the tool, for example low frequency noise which is produced by the banging of the tool against the side of the borehole. Tool noise is produced by waves propagating along or within the logging tool. Tool noise often occurs at frequencies close to the borehole signals and the noise also propagates at velocities close to the velocity of the borehole signals. Tool noise is thus coherent and not easily suppressed by conventional techniques.

If tool noise and road noise could be decoupled within the body of the logging tool to prevent propagation along the body of the tool, and if the acoustic signals could be detected so that they are not subject to amplitude and frequency distortion between the input signal and the output response signal, it would be possible to obtain composite signals which would accurately reflect selected borehole propagation modes. The composite signals from the receiver stations could then be used for an accurate determination of the changes in phase and amplitude of the borehole response over time and distance, from which formation properties can be determined.

From the forgoing discussion, it should be apparent that the acoustic transducers of a well logging tool should ideally be supported by a means which is incapable of passing detectable acoustic energy longitudinally between the spaced transducers at a velocity higher than that of the adjacent earth formations. If the support means for the transmitting and receiving transducers is not so constructed, the receiving circuits would be triggered prematurely by the acoustic energy traveling through the support means of the tool to thereby prevent the timing circuit from obtaining a time value accurately related to the velocity of the adjacent earth formations or other media. However, to meet these acoustical inhibiting conditions for acoustically blocking the direct sound path, the prior art support means have been complex and expensive to manufacture and have been expensive to maintain or have been lacking in strength qualities for repeated general field use. One method of the prior art utilized a cable between the transmitter section and the receiver section to act as an isolator. The support means in such cases was insufficiently rigid or of insufficient strength to allow pushing and pulling of the tool in, for example, a deviated well bore. Other problems encountered included looping of the cable used to suspend the tool in the well bore. Also, certain of the prior art tools suspended by cable within the well bore were insufficiently rigid to function as a weight indicator to determine when the bottom of the borehole had been reached.

Accordingly, it is an object of the present invention to provide an improved acoustic well tool with a support means having high strength qualities as well as the desired attenuation characteristics relative to the transmission of detectable shear wave acoustic energy.

Another object of the invention is to provide an improved well logging tool designed to provide attenuation of the acoustic signal between the transmitter and receiver arrays, within the receiver array and between, e.g., an outermost receiver transducer and the end of the tool.

Another object of the invention is to provide such a well logging tool having relatively high strength and rigidity to withstand the shocks and forces encountered in logging operations and specifically to withstand the forces encountered in running and retrieving the tool from a deviated well bore.

Another object of the invention is to provide an acoustic logging tool with a support adequately strong in tension to facilitate a fishing or retrieving operation if the tool should become temporarily immoveable in the well bore.

Another object of the invention is to provide an improved acoustic logging tool having high strength and yet having a support body flexible enough to artificially increase the normal time interval required for an acoustic pulse to pass therethrough.

Another object of the invention is to provide a new and improved support housing for an acoustic logging tool which is constructed of metal and a connecting material in a unique arrangement which provides a configuration such that the support has a lower velocity characteristic than normally would be expected.

Another object of the invention is to provide an improved support for an acoustic logging tool in accordance with the forgoing objects which is relatively inexpensive to manufacture, which is simple in design and which is durable and reliable in field operations.

SUMMARY OF THE INVENTION

The acoustic well tool of the invention includes a transmitter section containing at least one acoustic transmitter for transmitting acoustic signals to a surrounding borehole formation. The tool also includes a receiver section containing at least one acoustic receiver for receiving return acoustic signals. A semi-rigid housing is located between the transmitter section and the receiver section of the acoustic well tool for delaying and attenuating acoustic energy passing from the transmitter section to the receiver section of the acoustic well tool. The semi-rigid housing comprises at least two, and preferably a plurality, of rigid tubular members joined by a plurality of interlocking lobes which permit relative movement between the rigid tubular members but which prevent the separation thereof in ordinary use.

Preferably, the interlocking lobes of the at least two rigid tubular members making up the semi-rigid housing have gaps formed therebetween. The gaps are filled with a connecting medium which differs significantly in acoustic impedance from that of the material of the remaining semi-rigid housing. It is preferred that the connecting medium be provided having an acoustic impedance which is closer to that of the surrounding well bore fluid than to that of the remainder of the semi-rigid housing. Most preferably, the gaps between the interlocking lobes of the rigid tubular members making up the semi-rigid housing are filled with a connecting medium selected from the group consisting of rubber, plastic, epoxy and materials denser than steel such as lead.

The rigid tubular members making up the semi-rigid housing preferably have end regions with continuous alternately convex and concave curvatures which define lobes and recesses, each lobe having a reduced width neck. The rigid tubular members comprise first and second longitudinal sections which can move relative to one another. The first longitudinal section in each pair comprises at least a pair of lobe members evenly spaced about the circumference of the first longitudinal section which extend into cavities provided within the second longitudinal section of the pair. The lobes of the second longitudinal section are a mirror image of the lobes of the first longitudinal section and appropriately offset therefrom such that the lobes can move relative to each other but to prevent separation of the first and second longitudinal sections. Each lobe can be provided with an arcuate surface and a generally "S" shaped lateral surface such that a portion of the lateral surface of a lobe from the first longitudinal section lies directly opposite a portion of the lateral surface of a lobe of the second longitudinal section. In a most preferred embodiment, the connecting medium which fills the gaps between the interlocking lobes is a heat and solvent resistant rubber and the remainder of the semi-rigid housing of the tool is formed of any reasonably high strength metal, such as stainless steel.

Additional objects, features and advantages will be apparent in the written description which follows.

BRIEF DESCRIPTION OF THE DRAWINGS

FIG. 1 a simplified, perspective view of a well logging tool of the invention in a borehole showing the acoustic waves being generated and received thereby;

FIG. 2 a close-up, isolated view of a portion of the semi-rigid housing of the acoustic well tool of FIG. 1 showing the interlocking lobes and gaps therein;

FIG. 3 is a cross-sectional view taken along lines III—III in FIG. 2;

FIG. 4 a cross-sectional view taken along lines IV—IV in FIG. 2;

FIG. 5 a partial, perspective view of the semi-rigid housing portion of the well tool of FIG. 1 showing the bending movement which is allowed by the tubular members thereof;

FIGS. 6a and 6b together make up a simplified, operational view of a portion of the semi-rigid housing of the tool of the invention and showing the application of a connecting medium to the gaps therein; and FIG. 7 is a partial, perspective view of two of the rigid tubular members which make up the housing of the tool showing the interlocking lobes thereof.

FIG. 8 is an isolated, perspective view of another embodiment of the well logging tool of the invention.

FIG. 9 a partial, isolated view looking down along lines IX—IX in FIG. 8.

FIG. 10 is a perspective view of a prior art well logging tool which included a slotted sleeve region in the tool body.

DETAILED DESCRIPTION OF THE INVENTION

FIG. 1 shows a well logging tool of the invention designated generally as 11. The acoustic well tool 11 is shown suspended from a communication cable 13 within a borehole 15 which contains a liquid such as a "mud." In the embodiment shown, a transmitter section 17 is shown located above a receiver section 19. Between the transmitter and receiver sections is located a semi-rigid housing 21.

The exterior of the well logging tool is typically an elongated metallic (stainless steel) tube with openings for acoustic windows to allow acoustic signals to be transmitted from the interior of the transmitter section into the fluid of the borehole. The transmitter section contains one or more acoustic transmitters 23 which are capable of transmitting compressional waves into the borehole fluid in, for example, monopole, dipole, quadrupole, or other forms of multipole transmission. In addition, the transmitting section 17 may contain additional components used for the collection of downhole data such as a gamma ray detector or instrumentation for sending data to the surface or for receiving control signals from the surface. The use of the term "transmitter section" is not meant to limit the section to containing only acoustic transmitters.

The receiving section 19 of the device contains, for example, a receiver array 25 (shown in simplified fashion in FIG. 1) which is surrounded by an exterior jacket. In this case, the jacket is a tubular metallic shield having acoustic windows. The receiving section typically employs a receiver electronic section attached to the receiver array 25. In typical fashion, the receiver section contains a remotely controlled electronics package that contains a composite signal means for combining signals detected within the receiver array The electronics package sends signals to the surface by way of the communications cable 13 which is connected to the receiver electronic section by internal wiring. The receiver section can also contain additional components used for collecting downhole data and the term "receiver section" is not meant to limit this section to containing only electronic components related to acoustic signal acquisition.

In certain of the prior art acoustic logging tools, the transmitter section and receiver section of the device were coupled together in a tubular body with a continuous path for the travel of acoustic energy. However, problems arose when the signals generated by the transmitters for transmission into the borehole also propagated within the body or on the surface of the logging tool. If these signals within or on the surface of the logging tool were picked up by the detectors, the signals could interfere with the ability of the logging tool to obtain from the borehole usable signals which contain the borehole or earth response to the transmitted signals.

FIG. 10 shows another type prior art device, designated generally as 111 having a transmitter section 117 and a spaced apart receiver section 119. A slotted sleeve section 124 separates the transmitter section and receiver section 119 and forms a serpentine path of travel for acoustic wave energy. Slotted sleeve type designs will be familiar to those skilled in the art and are described, for example, in U.S. Pat. No. 3,191,141, issued Jun. 22, 1965, to Schuster. While the slotted sleeve design is often adequate for tools with only monopole transmitters, it has often proved to be inadequate for dipole, quadrupole, or other forms of multipole transmission.

The present invention involves the use of a semirigid housing 21 which supports and separates the transmitter section 17 and receiver section 19 in spaced-apart fashion. As shown in FIGS. 2–4, the semi-rigid housing 21 comprises at least two rigid tubular members 27, 29 (and preferably a plurality of such members, such as member 31) which are joined by a plurality of interlocking lobes 33, 35 which permit relative movement between the rigid tubular members 27, 29 but which prevent the separation thereof. The rigid tubular members can be formed of any reasonably high strength metal including stainless steel, titanium, iron and nickel alloys, beryllium copper and other copper alloys, etc.

The rigid tubular members 27, 29 thus comprise first and second longitudinal sections which can move relative to one another, as shown in FIG. 5. The first longitudinal section 27 comprises at least a pair (35 shown in FIG. 2) of lobe members evenly spaced about the circumference of the first longitudinal section which extend into cavities 37 provided within the second longitudinal section 29. The lobes of the second longitudinal section 33 are a mirror image of the lobes of the first longitudinal section and are appropriately offset therefrom such that the lobes can move relative to each other but prevent separation of the first and second longitudinal sections 27, 29. There are preferably four lobes on the respective ends of each longitudinal section in the preferred embodiment shown.

The interlocking lobes can be provided of any convenient shape which permits limited relative motion and yet which prevents one longitudinal section from being removed from the other. One such joint is shown in the preferred embodiment illustrated in the drawings with lobes of a "mushroom" shape. The particular cut can be made by laser cutting, abrasive water jet cutting, torch cutting or EDM of the stainless steel tubular body. In the embodiment shown in FIG. 2, each lobe 39 includes an arcuate surface 41 and a generally "S" shaped lateral surface 43 such that a portion of the lateral surface of the lobe 39 from one longitudinal section lies directly opposite a portion of the lateral surface of a lobe of a second longitudinal section. However, it will be understood that other interlocking lobe shapes could be utilized, as well, such as rectangular, triangular, and other polygonal interlocking configurations. Basically, any "jigsaw puzzle" type shape could conceivably be utilized. Asymmetric lobes could also be utilized in some circumstances.

As best seen in FIG. 7, the rigid tubular members 45, 47 making up the semi-rigid housing have gaps 49 formed between the interlocking lobes 51, 53, the gaps being filled with a connecting medium which differs in acoustic impedance from that of the material of the remaining semi-rigid housing, thereby delaying and attenuating acoustic energy pulses traveling longitudinally through the tool body. Preferably, the gaps 49 between the interlocking lobes of the rigid tubular members making up the semi-rigid housing are filled with a connecting medium having an acoustic impedance which is closer to that of the surrounding well bore fluid than to the material which makes up the remainder of the semi-rigid housing (in this case stainless steel).

Since the characteristic velocity of compressional acoustic energy in steel is in the neighborhood of 17,000 feet per second and for shear acoustic energy is 10,000 feet per second and the range of characteristic velocities of the earth formations or media being investigated is typically in the range from about 5,000 to 25,000 feet per second for compressional acoustic energy and 1,700 to 17,000 feet per second for shear acoustic energy, it will be appreciated that a solid steel support or housing has, in the past, been considered unsuitable for use in well tools of the type described. In the present invention, however, any direct linear path longitudinally of the tubular support is intentionally eliminated or interrupted to provide an acoustic interference pattern lengthwise of the housing which attenuates acoustic signals. In other words, the linear continuity of the tubular support in its lengthwise direction is substantially interrupted or disrupted by means of the connecting medium which fills the gaps between the interlocking lobes of the rigid tubular members making up the semi-rigid housing. Even though the connecting medium generally separates the interlocking lobes of the rigid tubular members, the design has sufficient strength and rigidity to limit flexing of the tubular housing whereby the tool can be more easily handled and installed at a desired location in the well bore.

The connecting medium used to fill the gaps 37 between the interlocking lobes 33, 35 can be any material having a substantially different acoustic impedance from that of the remaining housing material thereby providing a high "impedance contrast." A variety of types of material can be utilized including rubbers, epoxies, plastics and other materials, for example metals having properties of density and stiffness which differ significantly from steel, such as lead. The preferred connecting medium is a resilient natural or synthetic polymeric material, such as a heat and solvent resistant rubber. Preferred rubber formulations include, for example, nitrile rubber for its heat resistance. However, other more exotic formulations can be envisioned including fluorocarbon rubbers, such as the DuPont VITON™ and other compositions having improved heat resistance and corrosion and degradation resistant properties.

As shown in FIG. 8, the housing 121 can also be provided with interlocking lobes 123, 125 between receivers 127, 129, 131, 132 in the receiver array of the tool. The interlocking lobes 128 might also be located between, for example, the last receiver 132 and the end of the housing 130. The interlocking lobes in the semi-rigid housing portion of the tool might also be utilized together with one or more slotted sleeve regions 133, 135 of conventional design.

The manufacture of the housing portion of the tool is illustrated in FIGS. 6a and 6b. FIG. 6b shows a portion of the semi-rigid housing 21 having rigid tubular members 45, 47 separated by gap 49. A suitable mandrel (not shown) is first inserted within the interior of the rigid tubular members 45, 47 having an approximate outer diameter to be closely received therein. A conventionally available uncured nitrile rubber is provided in strips 46 from the roller press 48 and is applied by hand to the gap 49. Each gap 49 is then wrapped with a suitable heat resistant tape (not shown) and the semi-rigid housing is inserted within an autoclave for a suitable time and temperature to cure the nitrile rubber, according to the supplier's instructions. The transmitting and receiving sections of the tool can then be installed at the outer extents thereof.

In use, the gaps which are filled with the polymeric material function to reduce the overall stiffness of the well tool in bending and shear and, to some extent, in compression. This reduction in stiffness slows the average speed of acoustic waves traveling longitudinally in the material of the tube. Also, at each interface between the metal of the tube and the polymeric connecting material in the gaps, some of the energy of the acoustic wave is reflected back in the direction from which it came, thus attenuating the wave. The polymeric material can also be provided to have a higher damping coefficient than the metal of the tube, thereby tending to attenuate the acoustic waves traveling therethrough. The semi-rigid housing thus functions to slow and attenuate any acoustic wave traveling through the body of the logging tool such that this wave will not interfere with the acoustic waves arriving at the receiving section from the borehole/formation.

An invention has been provided with several advantages. The acoustic well tool of the invention utilizes a semi-rigid housing to support and separate the receiving and transmitting sections thereof. The semi-rigid housing delays and attenuates any acoustic waves traveling along the body of the tool while at the same time providing enough strength and stiffness for ease of handling by field personnel and to allow use in deviated boreholes. The rigidity provided by the interlocking joints of the semi-rigid housing provide sufficient stiffness to facilitate fishing or other operations should the tool become temporarily lodged in the borehole.

While the invention has been shown in only one of its forms, it is not thus limited but is susceptible to various changes and modifications without departing from the spirit thereof.

What is claimed is:

1. An acoustic well tool having an elongate body, comprising:
   a dipole transmitter section located on the elongate body for transmitting acoustic signals to a surrounding borehole formation;
   a receiver section located on the elongate body and spaced apart from the dipole transmitter section for receiving return acoustic signals from the dipole transmitter section;
   a semi-rigid housing located between the transmitter section and receiver section of the acoustic well tool on the elongate body for delaying and attenuating acoustic energy passing from the transmitter section to the receiver section of the acoustic well tool, the semi-rigid housing comprising at least two rigid tubular members having end regions joined by a plurality of interlocking lobes which permit relative movement between the rigid tubular members but which prevent the separation thereof
   wherein each end region of each rigid tubular member has at least three interlocking lobes; and
   wherein the interlocking lobes of the at least two rigid tubular members making up the semi-rigid housing have gaps formed therebetween, the gaps being filled with a connecting medium which differs in acoustic impedance from that of the semi-rigid housing.

2. The acoustic well tool of claim 1, wherein the gaps between the interlocking lobes of the rigid tubular members making up the semi-rigid housing are filled with a connecting medium having an acoustic impedance which is closer to that of a surrounding well bore fluid than to that of the semi-rigid housing.

3. The acoustic well tool of claim 1, wherein the gaps between the interlocking lobes of the rigid tubular members making up the semi-rigid housing are filled with a connecting medium selected from the group consisting of rubber, plastic, epoxy and lead.

4. The acoustic well tool of claim 1, wherein the gaps between the interlocking lobes of the rigid tubular members making up the semi-rigid housing are filled with a flexible rubber which is allowed to cure within the gaps and wherein the remaining semi-rigid housing is made of stainless steel.

5. The acoustic well tool of claim 1, wherein the rigid tubular members making up the semi-rigid housing have end regions with continuous alternately convex and concave curvatures defining lobes and recesses, each lobe having a reduced width neck.

6. The acoustic well tool of claim 1, wherein the rigid tubular members making up the semi-rigid housing comprise at least first and second longitudinal sections which move relative to one another, the first longitudinal section having an end region with four lobe members which extend into four cavities provided within the second longitudinal section, the second longitudinal section being a mirror image of the lobes and cavities of the first longitudinal section but offset therefrom such that the lobes can move relative to each other within the respective cavities but prevent separation of the first and second longitudinal sections.

7. The acoustic well tool of claim 6, wherein each lobe includes an arcuate surface and a generally "S" shaped lateral surface such that a portion of the lateral surface of a lobe from the first longitudinal section lies directly opposite a portion of the lateral surface of a lobe of the second longitudinal section.

8. The acoustic well tool of claim 1, wherein the semi-rigid housing includes at least one slotted sleeve region located along the elongate body in addition to the at least two rigid tubular members joined by a plurality of interlocking lobes.

9. An acoustic well tool for use in well bores, comprising:

an elongate tubular body having a longitudinal axis;

a dipole transmitter section located on the elongate body for transmitting acoustic signals to a surrounding borehole formation which are non-symmetrical with respect to the longitudinal axis of the elongate tubular body, and a receiving section located on the elongate body and spaced apart from the dipole transmitter section for receiving return acoustic signals;

a semi-rigid housing located between the transmitter section and receiver section on the elongate tubular body of the acoustic well tool for delaying and attenuating acoustic energy passing from the transmitter section to the receiver section along the elongate tubular body of the acoustic well tool, the semi-rigid housing comprising at least three rigid tubular members, each having an end region joined by a plurality of interlocking lobes having serpentine edges which permit relative movement between the rigid tubular members but which prevent the separation thereof, the interlocking lobes of the at least three rigid tubular members making up the semi-rigid housing having gaps formed therebetween, the gaps being filled with a connecting medium which differs in acoustic impedance from that of the semi-rigid housing, thereby delaying and attenuating acoustic energy pulses traveling longitudinally through the elongate tubular body; and wherein each end region of each rigid tubular member has at least four interlocking lobes and wherein the interlocking lobes of the end regions of the rigid tubular members support and separate the transmitting and receiving sections of the tool and provide sufficient strength and stiffness for use by field personnel without the presence of a central mandrel within the elongated tubular body of the tool.

10. The acoustic well tool of claim 9, wherein the gaps between the interlocking lobes of the rigid tubular members making up the semi-rigid housing are filled with a connecting medium having an acoustic impedance which is closer to that of a surrounding well bore fluid than to that of the semi-rigid housing.

11. The acoustic well tool of claim 10, wherein the connecting medium which fills the gaps between the interlocking lobes is nitrile rubber and wherein the remainder of the semi-rigid housing is formed of stainless steel.

* * * * *